(12) United States Patent
Mizuno et al.

(10) Patent No.: US 8,123,873 B2
(45) Date of Patent: Feb. 28, 2012

(54) METHOD FOR MANUFACTURING CARBURIZED PART, AND STEEL PART

(75) Inventors: Koki Mizuno, Tsushima (JP); Toshiyuki Morita, Tokai (JP)

(73) Assignee: Aisin AW Co., Ltd., Anjo (JP)

( * ) Notice: Subject to any disclaimer, the term of this patent is extended or adjusted under 35 U.S.C. 154(b) by 314 days.

(21) Appl. No.: 12/585,608

(22) Filed: Sep. 18, 2009

(65) Prior Publication Data

US 2010/0084051 A1 Apr. 8, 2010

(30) Foreign Application Priority Data

Oct. 8, 2008 (JP) ................. 2008-261673

(51) Int. Cl.
| | |
|---|---|
| *C23C 8/22* | (2006.01) |
| *C23C 8/80* | (2006.01) |
| *C22C 38/42* | (2006.01) |
| *C22C 38/44* | (2006.01) |
| *C22C 38/40* | (2006.01) |

(52) U.S. Cl. ...................................... 148/223; 148/319

(58) Field of Classification Search .................. 148/223, 148/319

See application file for complete search history.

(56) References Cited

U.S. PATENT DOCUMENTS 6,258,179 B1 * 7/2001 Takayama et al. ............ 148/233
(Continued)

FOREIGN PATENT DOCUMENTS

JP A-64-36779 2/1989
(Continued)

OTHER PUBLICATIONS

International Search Report dated Dec. 15, 2009 for U.S. National Phase Application No. PCT/JP2009/066693.

*Primary Examiner* — Jessee R. Roe
(74) *Attorney, Agent, or Firm* — Oliff & Berridge, PLC

(57) ABSTRACT

A method for manufacturing a carburized part that includes vacuum carburizing a steel under a reduced pressure of 2 kPa or less, so that a surface carbon concentration after slow cooling performed after carburizing falls in a range of 0.9 to 1.5%, performing the slow cooling by air cooling at such a cooling rate that causes pearlite transformation, to transform a surface structure into pearlite; and thereafter, performing induction hardening under such heating and cooling conditions that produce fine carbides in a range of up to 0.1 mm from a surface by finely dividing cementite in the pearlite structure, where the fine carbides contain 90% or more of carbides of 1 μm or less.

9 Claims, 1 Drawing Sheet

U.S. PATENT DOCUMENTS

| | | |
|---|---|---|
| 2007/0044866 A1 | 3/2007 | Morita et al. |
| 2008/0247901 A1 | 10/2008 | Morita et al. |

FOREIGN PATENT DOCUMENTS

| | | |
|---|---|---|
| JP | A-5-255733 | 10/1993 |
| JP | A-10-18020 | 1/1998 |
| JP | A-2007-291486 | 11/2007 |
| JP | A 2008-45200 | 2/2008 |
| JP | A-2008-63603 | 3/2008 |
| JP | A 2008-195997 | 8/2008 |
| JP | A 2008-280610 | 11/2008 |
| WO | WO 2006/118243 A1 | 11/2006 |
| WO | WO 2007/034911 A1 | 3/2007 |

* cited by examiner

AFTER VACUUM CARBURIZING
AND SLOW COOLING

AFTER VACUUM CARBURIZING
AND SLOW COOLING + INDUCTION HARDENING

METHOD FOR MANUFACTURING CARBURIZED PART, AND STEEL PART

INCORPORATION BY REFERENCE

The disclosure of Japanese Patent Application No. 2008-261673 filed on Oct. 8, 2008, including the specification, drawings and abstract is incorporated herein by reference in its entirety.

BACKGROUND

The present invention relates to methods for manufacturing a carburized part, and steel parts.

Conventionally, for mechanical parts such as gears, which are required to have high surface hardness, JIS (Japanese Industrial Standards) steels such as SCR420 are used by processing the steel into a shape of a part, and then performing surface hardening through case hardening.

At this time, the surface hardness and the strength can be increased if fine carbides can be produced on the surface, and also a large amount of carbides can be produced by the case hardening.

Actually, however, conventional case hardening methods cannot produce a large amount of such fine carbides on the surface in a desirable manner, and cannot increase the surface strength sufficiently.

Conventionally, a method for performing induction hardening after carburizing is known as a case hardening method. This method can be said to be an excellent method capable of providing both advantages of carburizing and advantages of induction hardening.

In the case where case hardening is performed by a common method in which direct quenching is performed after carburizing, martensite is formed up to the inside of the part, whereby the residual strain is increased. However, the strain is small in the case where induction hardening is performed after carburizing. This advantage is obtained because the induction hardening is capable of hardening only the surface without changing the inner structure of the part.

However, SCR420, which is a steel for carburizing, has a high content of Cr that tends to form carbides. Thus, when SCR420 is used, carbides tend to be produced during the carburizing process, and these carbides are less likely to melt in the subsequent induction hardening process. Therefore, it is difficult to obtain a carburized part with a uniform surface structure.

Moreover, fracture, starting from the residual carbides on the surface, tends to occur, whereby the strength is reduced.

In conventional common gas carburizing, the hardness has a highest value at a surface carbon concentration of about 0.8%, and it is difficult to increase the surface carbon concentration to a value higher than about 0.8%.

On the other hand, the surface carbon concentration can be increased to a value higher than about 0.8% in the case where vacuum carburizing is performed as a carburizing technique.

However, since SCR420 has a high content of Cr that tends to form carbides, increasing the surface carbon concentration by vacuum carburizing tends to further produce Cr carbides, and these Cr carbides become coarse. Such Cr carbides do not melt in the subsequent induction hardening process, whereby fracture, starting from the carbides, is further facilitated, reducing the strength.

In view of the above problems, the surface carbon concentration in carburizing is conventionally reduced to prevent production of carbides. In this case, however, the surface hardness is insufficient, and thus, a sufficient strength is not obtained.

Note that a carburized part using a steel having a composition similar to that of the present invention is disclosed in Japanese Patent Application Publication No. J-PA-2007-291486 as a related art of the present invention.

However, the carburized part disclosed in Japanese Patent Application Publication No. JP-A-2007-291486 is completely different from the present invention in a hardening technique following a carburizing process, and in a technique of producing carbides on the surface of the carburized part. Thus, the carburized part of Japanese Patent Application Publication No. JP-A-2007-291486 is different from the present invention.

Moreover, Japanese Patent Application Publication No. JP-A-2008-63603 shown below describes that an induction hardening step is performed after a carbonitriding step in a manufacturing method of a track member. However, the method disclosed in Japanese Patent Application Publication No. JP-A-2008-63603 is completely different from the present invention in the composition of a steel material, and thus, is also different from the present invention in a technique of producing carbides. Thus, the method in Japanese Patent Application Publication No. JP-A-2008-63603 is different from the present invention.

SUMMARY

The present invention was developed in view of the above problems, and it is an object of the present invention to provide a manufacturing method of a carburized part, which is capable of producing a large amount of fine carbides on a surface by a case hardening process, and thus, capable of producing high hardness, high strength carburized parts, and to provide a steel part.

In a manufacturing method of a carburized part according to the present invention, a low-C steel material is processed in advance into a shape of a part such as a gear, and is subjected to vacuum carburizing and slow cooling, and then, to induction hardening to harden the surface, thereby producing a carburized part.

In the present invention, C is introduced into the surface of a carburized part by the vacuum carburizing so that the surface carbon concentration after the slow cooling becomes 0.9 to 1.5%, and then, the surface structure is transformed to a pearlite single phase structure by the slow cooling.

Then, lamellar cementite, extending in a thin, elongated form in the pearlite structure, is finely divided by induction hardening, and then, martensite transformation is caused by cooling, whereby hardening is performed. Thus, numbers of fine carbides are produced in a dispersed state in the surface (a surface layer).

In this manner, carbides on the surface of the carburized part are fine-grained as much as possible, and also, a large amount of such carbides is produced, whereby the surface hardness and the surface strength of the carburized part are increased as compared to conventional examples.

That is, the manufacturing method of the present invention is characterized in that carbides on the surface of the carburized part are finely precipitated by dividing the cementite in the pearlite structure.

The present invention also uses a vacuum carburizing technique as a carburizing method.

The highest surface carbon concentration that can be achieved by common gas carburizing is about 0.8%. However, in the present invention, a surface carbon concentration higher than about 0.8% can be achieved by using vacuum carburizing.

The "vacuum carburizing" as used herein generally refers to a carburizing method in which an ambient pressure in a furnace is reduced, and a hydrocarbon gas (such as, e.g., methane, propane, ethylene, or acetylene) is directly introduced into the furnace as a carburizing gas, and by active carbons, which are decomposed when the gas is brought into contact with the steel surface, carbides are produced and carbons are accumulated during a carburizing period in which carbons are supplied to the steel surface, and then, the carbides are decomposed and the accumulated carbides are dissolved in a matrix during a diffusion period, whereby carbons are diffused inward, and the steel is carburized. The carbon supply route is not limited to the route via carbides, but carbons may be supplied via direct dissolution. In the present invention, the carburizing method is performed at a reduced pressure of 2 kPa or less.

In this case, a large amount of fine carbides can be produced on the surface of the carburized part, which greatly contributes to an increase in hardness and strength of the surface of the carburized part.

It should be noted that steels such as conventional SCR420 have a high content of Cr that tends to form carbides. Thus, when such steel is used as a steel material, Cr forms carbides during a carburizing process, if a large amount of C is introduced into the surface by vacuum carburizing.

In this case, these carbides become large, round, coarse carbides. Such coarse carbides become foreign matter on the surface of the carburized part, and serves as a starting point of fracture, thereby reducing the surface strength.

Thus, in the present invention, the steel material contains a low content of Cr that tends to form carbides, and a high content of Si that hinders production of carbides. In this manner, the composition of the steel material is adjusted so that, even if no carbide is formed during vacuum carburizing and C is introduced at a high concentration into the surface by the vacuum carburizing, the structure transforms into a pearlite single phase structure by the subsequent slow cooling process.

In the present invention, it is desirable that the cooling rate after carburizing be in the range of 5° C./s to 0.2° C./s, in order to transform the structure into a pearlite single phase structure by the slow cooling, which is performed after the surface is carburized with a high concentration of C by the vacuum carburizing.

If the cooling rate is lower than 0.2° C./s, coarse carbides are produced at the grain boundaries, whereby higher surface hardness and higher strength, which is an object of the present invention, cannot be implemented desirably.

On the other hand, if the cooling rate is higher than 5° C./s, the steel material is hardened by the cooling performed after the carburizing, whereby the structure transforms into martensite.

After such a carburizing process, the surface of the carburized part is induction hardened in the present invention.

Performing such high frequency heating for a short time (the heating time is 20 to 30 seconds) finely divides cementite in the pearlite structure in a longitudinal direction into fine carbides.

In this induction hardening, it is desirable that the surface of the carburized part be heated in the temperature range of 750 to 850° C.

If the temperature is higher than 850° C., not only the cementite is divided, but also the carbides produced by dividing the cementite dissolve into a matrix, whereby the object of the present invention cannot be achieved desirably.

On the other hand, if the temperature is lower than 750° C., the structure does not transform into austenite by the high frequency heating, and thus, is not sufficiently hardened by the subsequent cooling. That is, the structure does not transform into martensite in a desirable manner.

That is, although heating at a high temperature of 1,150° C. or higher is performed in common induction hardening, it is preferable to perform heating at a low temperature of 750 to 850° C. in the present invention.

Note that, in the induction hardening, it is desirable to perform cooling at 10° C./s or higher, and preferably, to perform water cooling.

In the manufacturing method of the present invention described above, a large amount of carbides can be produced on the surface of the carburized part, as shown by the values of the surface carbon concentration in the table of the examples described below (the values of the surface carbon concentration in the examples directly represent the amount of carbons). Moreover, fine carbides, containing 90% (the area ratio) or more of carbides having a size of 1 µm or less, can be produced.

Note that, in the present invention, since the steel material is a soft, low-C steel material, it is not necessary to perform spheroidizing before processing the steel material into a part such as a gear. Thus, no large, round carbide is produced by the spheroidizing.

In the present invention, the steel may contain one or more of Nb, Ti, and B in the above ranges.

Moreover, in the vacuum carburizing, carburizing may be performed so that the surface carbon concentration after slow cooling becomes 1.0% or more.

According to an aspect of the present invention, a steel part has a large amount of fine carbides produced on the surface thereof. Therefore, the surface hardness and the strength of the steel part can be increased as compared to conventional examples.

The reason why the chemical components of the steel material in the present invention are limited to the above ranges will be described below in detail.

C: 0.15 to 0.25%

If the C content is lower than the lower limit, ferrite is produced in the core, whereby the strength is reduced. On the other hand, if the C content exceeds the upper limit of 0.25%, workability, especially machinability, is reduced.

If the C content exceeds a certain value, the steel becomes hard, whereby spheroidizing is required in some cases when processing the workpiece into a part such as a gear. In such a case, large round carbides are produced during the spheroidizing process.

Si: 0.90 to 1.30%

In the present invention, Si is an important component for transforming the structure into pearlite by cooling after vacuum carburizing. If the Si content is lower than 0.90%, carbides tend to be produced by air-cooling after vacuum carburizing. Moreover, hardenability is reduced, whereby the strength is reduced.

On the other hand, if a large amount of Si exceeding 1.30% is contained, workability, especially machinability, is reduced.

Si is an element that facilitates grain boundary oxidation in the case of common gas carburizing, and this grain boundary oxidized layer causes reduction in impact strength and fatigue strength of the tooth root. It should be noted that, in the present invention, the use of vacuum carburizing (an ambient pressure is 2 kPa or less, for example) effectively reduces the problem of grain boundary oxidation, even though Si is contained.

In the present invention, a more desirable range of Si is 1.00 to 1.30%.

Mn: 0.70 to 1.10%

Mn is added as a deoxidizer when melting steel. If a large amount of Mn exceeding 1.10% is contained, workability, especially machinability, is reduced.

On the other hand, if the Mn content is less than 0.70%, ferrite is produced in the core, whereby the strength is reduced.

P: 0.030% or less

S: 0.100% or less

These are impurities, and are components that are not preferable for mechanical properties of the carburized part. The P content and the S content are limited to the above respective upper limits or less.

In particular, when toughness and hot workability are required, a more desirable range of S is 0.030% or less.

Cu: 0.01 to 0.50%

Ni: 0.01 to 0.50%

Cu and Ni are components that suppress production of carbides, and the Cu content and the Ni content are at least the lower limit of 0.01%.

On the other hand, adding a large amount of Cu and Ni exceeding 0.50% reduces hot workability.

A more desirable range of Cu is 0.05 to 0.30%, and a more desirable range of Ni is 0.04 to 0.30%. The Cu content of 0.05% or more and the Ni content of 0.04% or more can improve the core strength.

Cr: 0.20 to 0.50%

Cr is a component that facilitates production of carbides. If a large amount of Cr exceeding 0.50% is added, Cr forms carbides during processing after carburizing. Moreover, a pearlite single phase structure intended by the present invention cannot be obtained. Adding a large amount of Cr also reduces workability, in particular, machinability.

On the other hand, the Cr content less than 0.20% reduces hardenability, whereby the strength is reduced.

A more desirable range of Cr is 0.20 to 0.40%. The Cr content of 0.25% or higher can improve the core strength.

Mo: 0.50% or less

Mo is a component that improves hardenability. Adding a large amount of Mo exceeding 0.50% reduces workability of a steel, in particular, machinability thereof.

Note that, if the amount of Mo is less than 0.01%, martensitic transformation during hardening is not sufficient. This causes incomplete hardening, whereby the strength is reduced. Thus, it is desirable to add at least 0.01% or more of Mo.

A more desirable range of Mo is 0.05 to 0.40%. Moreover, the Mo content less than 0.30% can suppress production of carbides.

Al: 0.30% or less

Al is added as a deoxidizer. Al has also a function to refine crystal grains to increase the strength.

However, adding a large amount of Al exceeding 0.30% reduces the strength, since alumina is formed in a steel.

Note that, in order to ensure the function to make crystal grains finer to increase the strength, it is desirable to add 0.01% or more of Al.

A more desirable range of Al is 0.01 to 0.04%.

N: 0.05% or less

N has a function to prevent coarsening of crystal grains. Since this effect is saturated at about 0.05% of N, the range of N is about 0.05% or less.

Note that it is desirable that the N content be 0.002% or more. Further reduction in the N content increases the cost.

A more desirable range of N is 0.01 to 0.03%.

$$[Si]+[Ni]+[Cu]-[Cr]>0.5 \quad (1)$$

Si, Ni, and Cu suppress production of carbides, while Cr increases production of carbides.

In the present invention, by balancing the respective amounts of Si, Ni, Cu, and Cr, a pearlite structure single phase can be produced by cooling after vacuum carburizing, even if a workpiece is carburized at a high concentration by the vacuum carburization.

Surface carbon concentration: 0.9 to 1.5% (mass percent)

The strength of the surface of a carburized part cannot be effectively increased if the amount of carbides is less than 0.9%. On the other hand, even if the surface carbon concentration exceeds 1.5%, the strength is no longer increased, while graphite adheres and a carburizing furnace is polluted during carburizing. Thus, the upper limit is 1.5%.

Cooling rate after vacuum carburizing: 5° C./s to 0.2° C./s

If the cooling rate is higher than the upper limit, the structure transforms into martensite, and does not transform into pearlite. On the other hand, if the cooling rate is lower than the lower limit, coarse carbides are precipitated at the grain boundaries.

A more desirable range of the cooling rate is 4° C./s to 0.4° C./s.

Induction hardening temperature: 750 to 850° C.

If the hardening temperature is lower than the lower limit, the structure does not transform into austenite. This results in defective hardening, whereby the strength is reduced.

On the other hand, if the upper limit is higher than the upper limit, carbides melt too much that no carbide remains on the surface of a carburized part.

DETAILED DESCRIPTION OF EMBODIMENTS

Figure 1A:
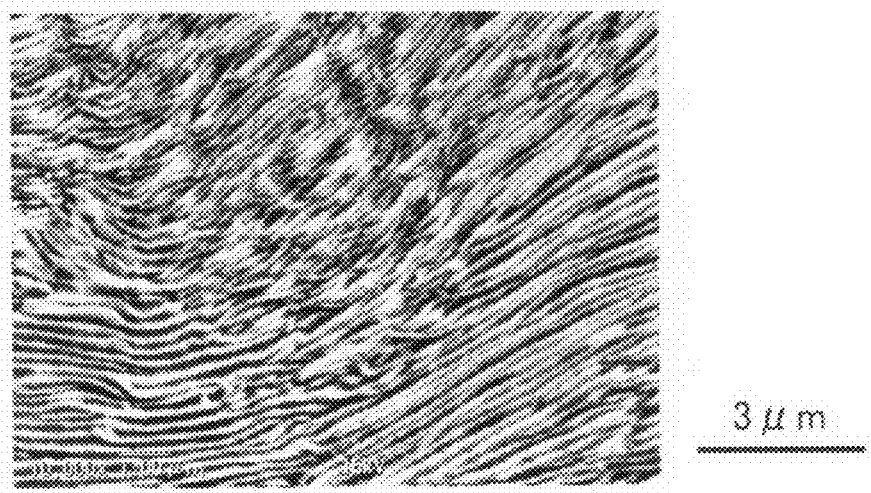
FIGS. 1A and 1B show scanning electron microscope (SEM) images of Example 1.

An embodiment of the present invention will be described in detail below.

Steels for carburizing having chemical compositions shown in Table 1 were melted, and each material was machined into a shape of a test gear described below.

The resultant parts were vacuum carburized at a temperature of 900 to 1,050° C., and more specifically, at a temperature shown in Table 2, and then, were cooled at a cooling rate of 5° C./s to 0.2° C./s, and more specifically, at a cooling rate shown in Table 2, and then, were heated under the heating conditions shown in Table 2 and cooled under the cooling conditions of 10° C./s or higher to perform induction hardening.

As described below, a fatigue strength test was performed on the obtained carburized parts to evaluate the tooth surface fatigue strength and the tooth root fatigue strength.

The evaluation result is also shown in Table 2.

Test Gear Shape

Module: 2.5

Number of Teeth: 30

Pitch Circle Diameter: 82.753 mm

Face Width: 20 mm

Torsion Angle: 25 degrees

Vacuum Carburizing

Vacuum carburizing was performed with an acetylene gas so as to keep the temperature at 900 to 1,050° C. under a reduced pressure of 1/100 atm or less.

After the carburizing, air cooling was performed to transform the structure into a pearlite single phase.

Induction Hardening

Heating was performed at a temperature of 750 to 850° C. for 20 to 30 seconds, and then, cooling (more specifically, water cooling in these examples) was performed at a cooling rate of 10° C./s or higher.

Fatigue Strength Test

The test gears were rotated under load to evaluate such a tooth root stress that breaks the tooth roots when the test gears were rotated $10^7$ times, and this tooth root stress was used as a measure of the tooth root fatigue strength. The tooth roots of other sample gears were strengthened by shot peening, and these sample gears were similarly rotated under load to evaluate such a tooth surface stress that breaks the tooth surfaces when the sample gears were rotated $10^7$ times, and this tooth surface stress was used as a measure of the tooth surface fatigue strength.

Measurement of Surface Carbon Concentration

The surface of the gear end face (the middle part of the tooth surface) was directly measured by spark discharge optical emission spectrometry (JIS G 1253).

Measurement of Carbine Area Ratio

After the induction hardening, the surface layer portions of the carburized parts were mirror polished, and were corroded with a picric acid alcohol solution, and then, carbides in an area of 0.1 mm$^2$ were observed by an SEM (scanning electron microscope) at 10,000 times magnification to obtain the ratio of the total area of carbides having a size of 1 μm or less in cross section, to the total carbide area.

TABLE 1

| | | COMPONENTS (MASS %) | | | | | | | | | | | | | EXPRESSION (1) |
|---|---|---|---|---|---|---|---|---|---|---|---|---|---|---|---|
| | | C | Si | Mn | P | S | Cu | Ni | Cr | Mo | Al | N | Nb | Ti | B | (MASS %) |
| EXAMPLES | 1 | 0.18 | 1.21 | 0.77 | 0.024 | 0.015 | 0.06 | 0.27 | 0.39 | 0.31 | 0.03 | 0.02 | | | | 1.14 |
| | 2 | 0.20 | 1.09 | 0.78 | 0.005 | 0.024 | 0.14 | 0.21 | 0.38 | 0.28 | 0.04 | 0.03 | | | | 1.05 |
| | 3 | 0.18 | 1.03 | 1.07 | 0.006 | 0.028 | 0.20 | 0.13 | 0.25 | 0.08 | 0.03 | 0.02 | | | | 1.11 |
| | 4 | 0.22 | 0.96 | 0.82 | 0.016 | 0.014 | 0.24 | 0.23 | 0.29 | 0.06 | 0.02 | 0.02 | | | | 1.13 |
| | 5 | 0.25 | 1.10 | 0.93 | 0.004 | 0.002 | 0.23 | 0.18 | 0.27 | 0.38 | 0.02 | 0.01 | | | | 1.24 |
| | 6 | 0.17 | 1.05 | 1.07 | 0.009 | 0.021 | 0.07 | 0.19 | 0.33 | 0.23 | 0.02 | 0.02 | 0.10 | | | 0.97 |
| | 7 | 0.20 | 1.21 | 1.06 | 0.013 | 0.020 | 0.29 | 0.15 | 0.22 | 0.24 | 0.03 | 0.02 | | 0.15 | | 1.43 |
| | 8 | 0.23 | 1.26 | 0.77 | 0.011 | 0.005 | 0.21 | 0.04 | 0.38 | 0.38 | 0.01 | 0.03 | | 0.05 | 0.0050 | 1.13 |
| COMPARATIVE EXAMPLES | 1 | 0.21 | 0.71 | 0.72 | 0.020 | 0.025 | 0.03 | 0.02 | 0.48 | 0.39 | 0.04 | 0.01 | | | | 0.28 |
| | 2 | 0.18 | 1.01 | 0.98 | 0.004 | 0.013 | 0.04 | 0.05 | 0.80 | 0.07 | 0.01 | 0.02 | | | | 0.30 |
| | 3 | 0.25 | 1.06 | 0.84 | 0.019 | 0.015 | 0.18 | 0.15 | 0.25 | 0.38 | 0.04 | 0.02 | | | | 1.14 |
| | 4 | 0.22 | 0.97 | 0.78 | 0.022 | 0.025 | 0.02 | 0.13 | 0.33 | 0.38 | 0.01 | 0.02 | | | | 0.79 |
| | 5 | 0.17 | 1.17 | 1.06 | 0.026 | 0.026 | 0.18 | 0.04 | 0.37 | 0.17 | 0.05 | 0.02 | | | | 1.02 |
| | 6 | 0.17 | 1.23 | 1.04 | 0.009 | 0.029 | 0.28 | 0.14 | 0.38 | 0.45 | 0.04 | 0.03 | | | | 1.27 |

EXPRESSION (1): Si + Ni + Cu—Cr

TABLE 2

| | | VACUUM CARBURIZING (CARBURIZING GAS) | VACUUM CARBURIZING TEMPERATURE (° C.) | COOLING RATE (° C./s) | SURFACE CARBON CONCENTRATION (%) |
|---|---|---|---|---|---|
| EXAMPLES | 1 | ACETYLENE | 1000 | 4 | 1.29 |
| | 2 | ACETYLENE | 1000 | 4 | 1.29 |
| | 3 | ACETYLENE | 1000 | 4 | 1.40 |
| | 4 | ACETYLENE | 1000 | 0.4 | 1.24 |
| | 5 | ACETYLENE | 900 | 4 | 1.05 |
| | 6 | ACETYLENE | 1000 | 4 | 1.04 |
| | 7 | ACETYLENE | 1000 | 4 | 1.15 |
| | 8 | ACETYLENE | 1000 | 4 | 1.42 |
| COMPARATIVE EXAMPLES | 1 | ACETYLENE | 1000 | 4 | 1.39 |
| | 2 | ACETYLENE | 1000 | 4 | 0.95 |
| | 3 | ACETYLENE | 1000 | 4 | 0.70 |
| | 4 | ACETYLENE | 1000 | 4 | 0.85 |
| | 5 | ACETYLENE | 1000 | 4 | 0.98 |
| | 6 | ACETYLENE | 1000 | 4 | 0.95 |

| | | INDUCTION HEATING TEMPERATURE (° C.) | PROPORTION OF CARBIDES OF 1 μm OR LESS | TOOTH SURFACE FATIGUE STRENGTH (MPa) | TOOTH ROOT FATIGUE STRENGTH (MPa) |
|---|---|---|---|---|---|
| EXAMPLES | 1 | 769 | 98% | 3.89 | 1144 |
| | 2 | 769 | 99% | 3.95 | 1194 |
| | 3 | 769 | 95% | 3.98 | 1026 |
| | 4 | 751 | 97% | 3.86 | 1001 |
| | 5 | 766 | 99% | 3.66 | 1071 |
| | 6 | 794 | 95% | 3.60 | 1088 |
| | 7 | 790 | 97% | 3.73 | 1052 |
| | 8 | 841 | 96% | 4.12 | 1013 |

TABLE 2-continued

| | | | | | |
|---|---|---|---|---|---|
| COMPARATIVE EXAMPLES | 1 | 845 | 8% | 4.00 | 901 |
| | 2 | 759 | 61% | 3.44 | 983 |
| | 3 | 830 | NO CARBIDE | 2.63 | 1199 |
| | 4 | 835 | 28% | 2.11 | 1228 |
| | 5 | 710 | 42% | 1.04 | 1024 |
| | 6 | 910 | NO CARBIDE | 2.11 | 1106 |

As shown by the result of Table 2, in Comparative Example 1 in which the Si content is as low as 0.71%, and the value of Expression (1) is 0.28, which is lower than the lower limit of the present invention, the proportion of carbides of 1 μm or less is as low as 8%, resulting in a low tooth root fatigue strength.

In Comparative Example 2 in which the Cr content is 0.80%, which is higher than the upper limit of 0.50% in the present invention, and the value of Expression (1) is lower than the lower limit of 0.5 in the present invention, the proportion of fine (1 μm or less) carbides is as low as 61%, and thus, both the tooth surface fatigue strength and the tooth root fatigue strength are low.

The tooth surface fatigue strength is low both in Comparative Example 3 in which the surface carbon concentration is as low as 0.70, and no carbide is produced on the surface, and in Comparative Example 4 in which the surface carbon concentration is as low as 0.85, and the amount of fine carbides on the surface is as low as 28%.

Moreover, the tooth surface fatigue strength is low in Comparative Example 5 in which the heating temperature for induction hardening is as low as 710° C., and the amount of fine carbides on the surface is as low as 42%.

Moreover, the tooth surface fatigue strength is low in Comparative Example 6 in which the heating temperature for induction hardening is as high as 910° C., and no carbide is produced on the surface.

On the other hand, the examples of the present invention have excellent results since a large amount of fine carbides is produced on the surface, and both the tooth surface fatigue strength and the tooth root fatigue strength are high.

Figure 1B:
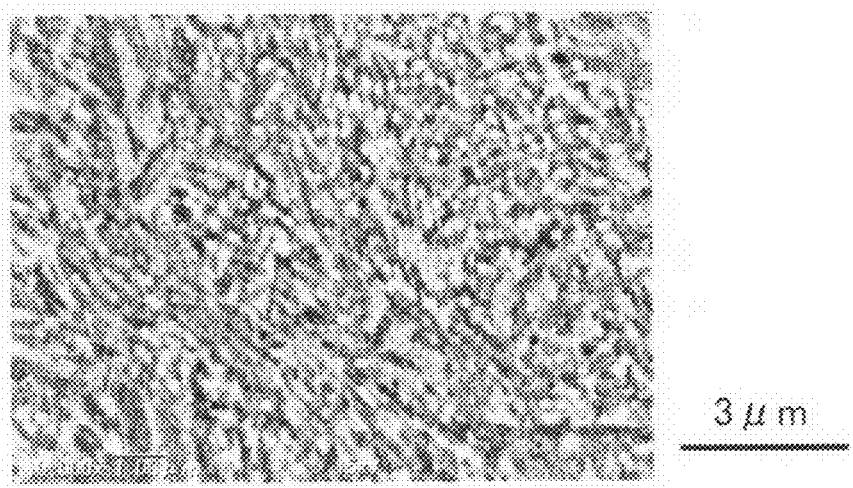

Note that FIG. 1A is an SEM image of Example 1 after vacuum carburizing and slow cooling, and FIG. 1B is an SEM image after the subsequent induction hardening (both are at 10,000 times magnification).

It can be seen from FIG. 1A that the structure has transformed into a pearlite single phase structure in a desirable manner after the vacuum carburizing and the slow cooling. It can also be seen from FIG. 1B that a multiplicity of fine carbides, resulting from dividing cementite, have been finely dispersed by the subsequent induction hardening (grain-like white dots in FIG. 1B are carbides).

Although the embodiment of the present invention has been described in detail, this embodiment was shown by way of example only, and the present invention can be implemented in various modified forms without departing from the subject matter of the present invention.

The invention claimed is:

1. A method for manufacturing a carburized part, comprising:
vacuum carburizing a steel under a reduced pressure of 2 kPa or less, so that a surface carbon concentration after slow cooling performed after carburizing falls in a range of 0.9 to 1.5 mass percent, where the steel has a composition containing, by mass percent,
C: 0.15 to 0.25%,
Si: 0.90 to 1.30%,
Mn: 0.70 to 1.10%,
P: 0.030% or less,
S: 0.100% or less
Cu: 0.01 to 0.50%,
Ni: 0.01 to 0.50%,
Cr: 0.20 to 0.50%,
Mo: 0.50% or less,
Al: 0.30% or less,
N: 0.05% or less, and
a balance of Fe and unavoidable impurities, and satisfying the following Expression (1)

$$[Si]+[Ni]+[Cu]-[Cr]>0.5 \quad (1)$$

(where each element symbol in Expression (1) represents a content in mass percent of the element);
performing the slow cooling by air cooling at such a cooling rate that causes pearlite transformation, to transform a surface structure into pearlite; and
thereafter, performing induction hardening under such heating and cooling conditions that produce fine carbides in a range of up to 0.1 mm from a surface by finely dividing cementite in the pearlite structure, where the fine carbides contain 90% or more of carbides of 1 μm or less by area ratio.

2. The method according to claim 1, wherein the slow cooling by air cooling is performed at a cooling rate of 5° C./s to 0.2° C./s, and the induction hardening is performed at a heating temperature of 750 to 850° C.

3. The method according to claim 1, wherein the steel further contains, in mass percent, one or more of
Nb: 0.02 to 0.20%,
Ti: 0.02 to 0.20%, and
B: 0.0005 to 0.0100%.

4. The method according to claim 1, wherein the vacuum carburizing is performed so that the surface carbon concentration after the slow cooling becomes 1.0 to 1.5 mass percent.

5. A steel part, wherein the steel part has a surface carbon concentration of 0.9 to 1.5 mass percent, and fine carbides have been produced in a range of up to 0.1 mm from a surface by dividing cementite in a pearlite structure, where the fine carbides contain 90% or more of carbides of 1 μm or less by area ratio.

6. The steel part according to claim 5, wherein
the steel part has a composition containing, by mass percent,
C: 0.15 to 0.25%,
Si: 0.90 to 1.30%,
Mn: 0.70 to 1.10%,
P: 0.030% or less,
S: 0.100% or less,
Cu: 0.01 to 0.50%,
Ni: 0.01 to 0.50%,
Cr: 0.20 to 0.50%,
Mo: 0.50% or less,
Al: 0.30% or less,
N: 0.05% or less, and
a balance of Fe and unavoidable impurities, and satisfying the following Expression (1)

$$[Si]+[Ni]+[Cu]-[Cr]>0.5 \quad (1)$$

(where each element symbol in Expression (1) represents a content in mass percent of the element), and the fine carbides have been produced in the range of up to 0.1 mm from the surface by performing vacuum carburizing and subsequent cooling, and induction hardening.

7. The steel part according to claim 5, wherein the carbides have been produced in a structure having, in area percent, 50% or more of a martensite structure.

8. The steel part according to claim 5, wherein the steel further contains, in mass percent, one or more of
Nb: 0.02 to 0.20%,
Ti: 0.02 to 0.20%, and
B: 0.0005 to 0.0100%.

9. The steel part according to claim 5, wherein the surface carbon concentration is 1.0 to 1.5 mass percent.

* * * * *